United States Patent [19]

Woinsky

[11] 4,341,077

[45] * Jul. 27, 1982

[54] PROCESS AND SYSTEM FOR RECOVERY OF ENERGY FROM GEOTHERMAL BRINES AND OTHER HOT WATER SOURCES

[75] Inventor: Samuel G. Woinsky, Irvine, Calif.

[73] Assignee: Occidental Petroleum Corporation, Los Angeles, Calif.

[*] Notice: The portion of the term of this patent subsequent to Jul. 22, 1997, has been disclaimed.

[21] Appl. No.: 84,537

[22] Filed: Oct. 15, 1979

Related U.S. Application Data

[63] Continuation of Ser. No. 763,533, Jan. 28, 1977, abandoned.

[51] Int. Cl.³ .............................................. F03G 7/00
[52] U.S. Cl. .................................................. 60/641.3
[58] Field of Search ................... 60/641, 641.2, 641.3, 60/641.5

[56] References Cited

U.S. PATENT DOCUMENTS

| 3,845,627 | 11/1974 | Hutchinson | 60/641 |
| 3,988,895 | 11/1976 | Sheinbaum | 60/641.3 |
| 4,089,175 | 5/1978 | Woinsky | 60/641.3 |

Primary Examiner—Allen M. Ostrager
Attorney, Agent, or Firm—Barry A. Bisson; Max Geldin

[57] ABSTRACT

Process and system for recovery of energy from geothermal brines and other hot water sources, which comprises direct contact heat exchange between the brine or hot water, and a hydrocarbon working fluid, e.g. n-butane, in a heat transfer column, the heat transfer column being operated at or above the critical pressure of the working fluid, and the hot brine or hot water feed being at a temperature at or above the critical temperature of the working fluid. The heated working fluid exiting the top of the heat transfer column is expanded through an expander to produce work. The discharge from the expander is cooled to condense working fluid which is separated in an accumulator, from condensed water vapor present in the working fluid, and the condensed working fluid is pressurized and fed back to the heat transfer column. Water from the accumulator can be fed to an H₂S removal system where good quality water can be recovered. Cooled brine or water from the bottom of the heat transfer column is fed to a flashing device such as a flash drum and the working fluid flashed off is compressed and returned to the cooler at the expander discharge, for condensation and recovery. Such cooled brine or water can be fed to one or more liquid expanders prior to flashing to produce additional work. Also, entrained liquid phase working fluid can be separated from the cooled brine or water prior to flashing, and returned to the system. Uncondensible gases plus some working fluid losses are vented from the accumulator and preferably the system can be operated under conditions to vent a minimum of uncondensible gas from the accumulator, and thereby reduce working fluid losses. Any accumulator vent gas can be fed to the H₂S removal system. Cold brine or water is discharged from the flash drum. Alternatively, if the flash drum is employed as a stripping column, a portion of the vent gas from the accumulator can be recycled as stripping gas to the stripping column for recovery of working fluids therefrom. Preferably, the uncondensible gases are removed from the feed brine or hot water prior to entry into the heat transfer column, such degassing preferably being carried out by a simple flash followed by energy recovery in a steam expander. The steam from the steam expander can be fed to the H₂S removal system.

25 Claims, 7 Drawing Figures

PROCESS AND SYSTEM FOR RECOVERY OF ENERGY FROM GEOTHERMAL BRINES AND OTHER HOT WATER SOURCES

This is a continuation of application Ser. No. 763,533, filed Jan. 28, 1977, now abandoned.

BACKGROUND OF THE INVENTION

This invention relates to the recovery of energy from geothermal brines and other hot water sources, and is particularly concerned with a process and system of the aforementioned type, employing direct contact heat exchange between the hot brine or hot water feed, and a working fluid, wherein the heated working fluid is expanded to produce work, and the expanded and discharged working fluid is recycled to the heat transfer column, and further providing for working fluid recovery under conditions to afford minimum working fluid loss and maximum energy extracted from the expander.

In prior art processes and systems for recovery of energy from geothermal brines and other hot water sources, employing heat exchange between the hot brine or hot water, and a working fluid, there has been no recognition heretofore of the problem of obtaining a heat balance in the heat transfer column with close temperature differentials or $\Delta t$'s between brine or water and working fluid, to obtain maximum efficiency. The prior art also has failed to recognize the problem of working fluid loss in uncondensible gases which come into the system particularly with the hot brine or hot water and which must be vented. Further, the prior art has failed to provide for the problem of working fluid loss in exit brine or hot water from the heat transfer column, and recycle of such recovered working fluid to the heat transfer column.

It is accordingly a chief object of the invention to provide a process and system for recovery of energy from geothermal brines and hot water sources by operation of a heat transfer column preferably providing direct heat transfer between the hot brine or hot water, and a working fluid, under conditions of operation particularly with respect to pressure in the heat transfer column and temperature of the hot brine or hot water feed, in relation to the critical pressure and temperature of the working fluid, to allow maximum energy recovery for any individual working fluid. A further object is the provision for recovery of additional energy by expanding the cold brine or water from the bottom of the heat transfer column. A still further object is the provision in the procedure and system, for removal of working fluid from the exit brine or water from the column and recovery of such working fluid. An additional object is the control of the working fluid concentration in the uncondensible vent gas from the system to obtain an economic balance between energy recovery from the process and system, and working fluid loss in the uncondensible vent gas. Yet another object is to operate under conditions to substantially reduce the quantity of vent gas containing working fluid that vents from the system to thereby minimize working fluid losses, while maximizing energy recovery. Still another object is the provision of simple and efficient procedure for removing the major portion of uncondensible gases from the incoming brine or hot water source prior to introduction into the heat transfer column. Another object is the provision of procedure and a system for converting H$_2$S in such removed uncondensible gases to sulfur. Another object is to use the H$_2$S converting system to also handle condensed water and any vent gas from the accumulator, thus reducing air and water pollution problems and recovering good quality water.

BRIEF SUMMARY OF THE INVENTION

The above objects are achieved according to the invention by the provision of a process and system for recovering energy from geothermal brines and other hot water sources such as waters heated by solar energy or other means, the energy being recovered from the brine or hot water using a working fluid such as a hydrocarbon, e.g. n-butane. The working fluid is heated by the brine or hot water preferably in a direct contact heat transfer column. The heated working fluid is passed through an expander to produce work, which is used to generate electricity or drive equipment. The working fluid from the expander is condensed in a cooler. Condensed working fluid, water and uncondensed gas are separated in an accumulator. The cool liquid working fluid is pumped from the accumulator to the heat transfer column to be heated and carried through the cycle repeatedly.

Cooled brine or water which heated the working fluid in the heat transfer column exits from the bottom of the column which acts as a liquid-liquid separator to minimize entrainment of the working fluid. This cooled brine or water withdrawn from the column can be mixed with water separated from the working fluid in the accumulator, and is flashed at a pressure lower than that in the accumulator to flash off entrained and dissolved working fluid in the brine or water from the heat transfer column. The flashed working fluid is then compressed and fed to the cooler at the discharge from the expander, which is used to condense working fluid, and thus is recovered.

According to one mode of operation, uncondensible gases which are introduced into the system with the feed brine or hot water are vented from the system at the accumulator, and carry away some of the expanded working fluid. If desired, stripping of the cooled brine or water withdrawn from the column, with uncondensed gas from the accumulator for recovery of working fluid from such brine or cool water can be employed, if necessary, to further decrease the loss of working fluid in such exit brine or water. In this embodiment, uncondensed gas is vented from the accumulator preferably under pressure control set for an economic balance between working fluid loss in the vent gas and energy recovery in the expander.

According to an alternative preferred mode of operation, the working fluid recovery flash system is operated at a sufficiently high pressure in relation to the pressure in the accumulator so that the recycle of uncondensible gases to the accumulator is substantially reduced, thus substantially reducing or eliminating the discharge of any vent gas from the accumulator. Although such procedure will increase the loss of working fluid in the brine or hot water discharged from the flash system, the total loss of working fluid is less than in the first mode of operation noted above. This preferred alternative mode of procedure allows the accumulator to be operated essentially at the working fluid saturation pressure corresponding to the working fluid temperature in the accumulator. This procedure maximizes the energy that can be extracted in the expander.

In order to decrease the loss of working fluid in any gas which is vented from the system, the hot water or brine feed to the heat transfer column is initially degassed. This operation will decrease the amount of any uncondensible vent gas from the accumulator, and the loss of working fluid therewith. A preferred procedure for this purpose is by simple flashing of the brine, and recovery of the energy of the resulting steam in a steam expander.

An important feature of the above described invention process and system resides in operating the heat transfer column at or above the critical pressure of the working fluid, with the hot brine or hot water feed at or above the critical temperature of the working fluid, and converting the working fluid to a dense phase fluid, as defined hereinafter. This procedure provides for operation in the region which will allow maximum energy recovery for any individual working fluid. It also eliminates the large temperature differential or $\Delta t$ region at the working fluid's vaporization point which requires operation with large brine or water to working fluid $\Delta t$'s to allow the system to achieve heat balance.

In normal operation, since the cooled brine or water exiting the column and which is flashed off to recover entrained or dissolved working fluid, can still be at relatively high temperature, in order to maximize the recovery of energy from the hot brine or hot water feed, two or more units of the basic system noted above can be employed in series, the flashed exit brine or water from one unit of the system serving as the feed to the heat transfer column of the second like unit, etc. In such modification a different working fluid is usually employed in the heat transfer column of the second unit from the working fluid in the heat transfer column of the first unit, in order to adjust the critical temperature conditions of the working fluid in the second heat transfer column with respect to the temperature of the feed brine or water to such heat transfer column of the second unit.

Another invention feature is the use of mixtures of working fluids, e.g. in the heat transfer column of the above noted second unit, in order to adjust the critical properties of the working fluid therein, with respect to the temperature of the hot brine or hot water feed thereto, and to obtain optimum operation.

A further feature of the invention is the flashing or stripping of working fluid contained in the exit brine or water from the heat transfer column, followed by compression and condensation of such working fluid to provide recovery of working fluid from such exit brine or water.

A still further feature of the invention is the degassing of feed brine or hot water prior to introduction into the heat transfer column, and accumulator pressure control for economic balance between energy recovery and working fluid loss in the vent gas from the accumulator, affording minimum working fluid loss.

Another feature according to a preferred embodiment is the degassing of feed brine or hot water for removal preferably of the major portion of uncondensible gases therein, by a simple flash and work expansion of the overhead steam.

Still another feature includes an $H_2S$ removal system involving stripping a mixture of condensate obtained by cooling the above brine flash and work expanded steam, and $H_2S$-containing water condensate from the accumulator, with just enough air to meet the needs of a modified Claus process for converting the $H_2S$ to sulfur, and feeding the resultant overhead mixture containing air, steam and $H_2S$, to such modified Claus process, for recovery of sulfur, good quality water, and net electrical energy output. Any vent gas from the accumulator can also be introduced directly into the Claus process.

Additional features include the use of one or more liquid expanders in the exit brine line from the bottom of the heat transfer column to recover additional energy, the use of one or more parallel plate working fluid or oil separators in the brine exit system to reduce entrainment and loss of working fluid, and provision for injection of spent brine into a brine injection well.

The invention system including particularly a combination of certain of the above features affords an economical and highly practical process and system for energy recovery from geothermal brines and other hot water sources.

THE DRAWINGS

The above and other features and advantages of the invention will be more clearly understood by reference to the following detailed description of the invention, taken in connection with the accompanying drawings wherein.

DETAILED DESCRIPTION

Figures 1, 2:
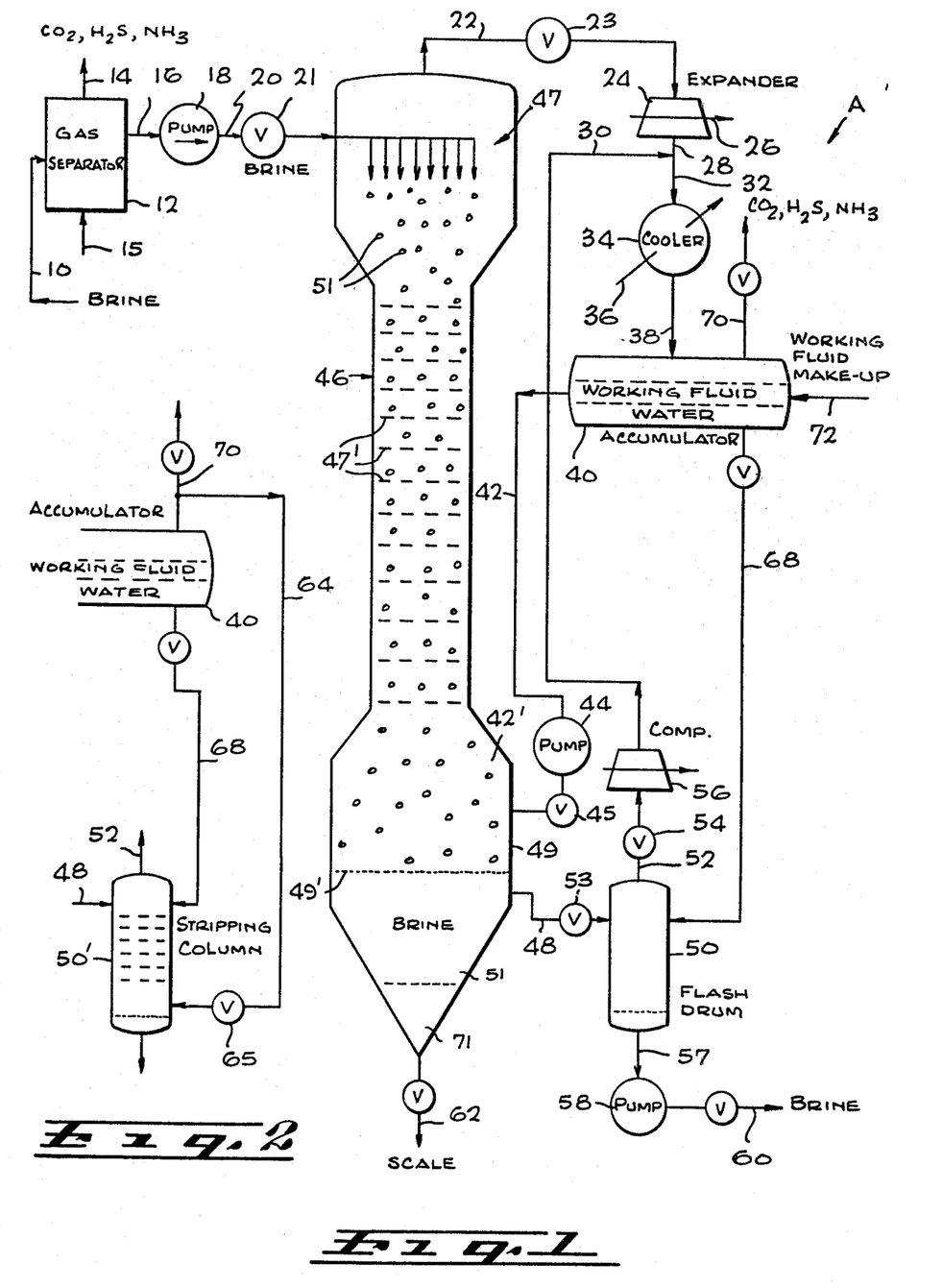
FIG. 1 is a flow chart illustrating one mode of practice of the invention process and system.
FIG. 2 is a further modification of the process and system illustrated in FIG. 1 employing a stripping column for working fluid recovery instead of a flash drum.

Referring to FIG. 1 of the drawing, geothermal brine or hot water enters through inlet means or conduit 10 into degassing unit 12 where uncondensible gases are removed through outlet means or conduit 14. For this purpose steam stripping can be used, the steam being introduced at 15 into the degasser. If desired, other means such as simple flashing or the use of a solid adsorption medium, e.g. a zeolite, or other means can be employed for this purpose. Usually, the uncondensible gases in hot geothermal brine include $CO_2$, $H_2S$ and $NH_3$.

The degassed hot water or brine then passes through conduit means 16 to pump 18 which discharges through the conduit means 20 via valve 21 into the top of a heat transfer column 46 in direct contact heat exchange with a working fluid. Such working fluid can be any suitable material which does not undergo a density inversion. For example, a density inversion would correspond to a situation where the density of the working fluid at the cold end of the column is greater than the density of the brine or water at that end of the column, and at the hot end of the column the density of the working fluid is less than the density of the brine or water at that end of the column, thereby preventing countercurrent flow of working fluid and water containing fluid such as brine.

Thus, the working fluid can be a hydrocarbon including aromatics, paraffins, naphthenes and olefins. Preferably, the working fluid is a paraffin or olefinic hydrocarbon containing from about 1 to about 8 carbon atoms, either straight or branched chain such as methane, ethane, propane, n-butane, isobutane, n-pentane, isopentane, neopentane (2,2 dimethylpropane), n-hexane, cyclohexane, n-heptane, n-octane, isooctane, and the analogous olefins such as n-butene, isobutene, and the like. Most desirably, paraffinic or olefinic hydrocarbons containing from about 2 to about 5 carbon atoms are employed. Aromatic hydrocarbons such as benzene, toluene and xylene also can be used.

Mixtures of such hydrocarbons can also be utilized, such as, for example, a mixture of methane and ethane, ethane and n-propane, or n-propane and n-butane, in order to optimize the critical temperature and pressure conditions of the working fluid, and thereby obtain maximum energy recovery from the geothermal brine or hot water feed.

Working fluids other than hydrocarbons also can be used, such as ethers, e.g. dimethyl, diethyl and methyl ethyl ether. Other substances are also suitable provided they do not undergo the above noted density inversion. In this respect the fluorocarbons known as "Freons" undergo such density inversion and thus are unsuitable.

The hot water or brine is fed to the column at or above the critical temperature of the particular working fluid employed in the column. Inlet temperature of the hot water or brine to the top of the column ranges from about 60° to about 600° F., usually about 100° to about 600° F., with the range of about 150° to about 400° F. being preferred. The heat transfer column 46 is operated at or above the critical pressure of the working fluid in the top of the column, such pressure preferably ranging from about 450 psia to about 1,000 psia. The working fluid is heated in the heat exchange column 46 by direct contact with the incoming hot brine or hot water. For this purpose a distributor 47 is provided at the top of the column, which can be in the form of a manifold having a plurality of spray nozzles (not shown) for rpraying the hot brine or hot water at 51 downwardly into the column. However, other types of distributors can be employed such as a multiple "V" notched weir type, the distributor functioning to obtain sufficiently small drop sizes of hot liquid brine or water to provide good heat transfer rates.

The heat transfer column 46 can be of any conventional type such as disk-and-doughnut which would prevent back mixing and provide a large open area for any scale problems. The upper region of the column where the working fluid is more like a gas than a liquid can employ angle iron trays (not shown) similar to those used in ethylene plant wash towers. Perforated plate dual flow trays as indicated schematically at 47' can be used with a high agitation, keeping any scale suspended.

The lower portion 49 of the heat transfer column functions as a liquid-liquid separator and can be a simple gravity separator or parallel plates (not shown) can be provided to improve separation and minimize entrainment of working fluid. However, any entrained working fluid can be recovered in the working fluid recovery section shown in FIG. 1 and described in greater detail below.

In the system described above, and illustrated in FIG. 1, the working fluid 42' passing upwardly in the column countercurrent to the flow of feed brine or water, is the continuous phase, and the brine or water distributed into the top of the column is the discontinuous phase, the interface 49' between the working fluid and the brine or water phases being at the bottom of the column.

As previously noted, the heat exchange column 46 is operated so that the working fluid in the top zone of the column will be at or above the working fluid's critical temperature, and the partial pressure of the working fluid in the working fluid stream at the top zone will be at or above the working fluid's critical pressure. This mode of operation removes the high localized heat load due to the heat of vaporization which is experienced at subcritical conditions. Thus, such operation causes the working fluid to be converted from a liquid to a dense phase fluid at or above the critical temperature of the fluid and at a partial pressure equal to or greater than its critical pressure. The term "dense phase fluid" means any fluid at or above its critical temperature and pressure. Therefore, there is no heat of vaporization and no large Δt at the vaporization point. Consequently, the heat transfer column can heat balance with close Δt's between inlet brine or water and working fluid.

The heated dense phase working fluid in the top of the column is passed through conduit 22, via valve 23, to a work expander 24, where it expands to produce work which is transmitted through shaft 26. The expander outlet pressure can range from about 1 to about 600 psia, but is preferably in the range of about 30 to about 250 psia.

The expander working fluid is then passed via conduit 28, wherein it is mixed with recovered working fluid from line 30, and the resulting mixture passes via line 32 into a cooler 34, using cool water or air fed through line 36 as cooling medium to condense working fluid. Condensation temperature in the cooler preferably is in the range of about 80° F. to about 140° F. The condensed working fluid is then fed through conduit 38 to an accumulator 40.

Water vapor present in the working fluid in line 22 condenses in expander 24 and cooler 34, and is separated from condensed working fluid in accumulator 40, along with any uncondensibles not removed in the degasser 12.

As previously pointed out, uncondensed gas containing some working fluid is vented at 70 from the accumulator under pressure control set for an economic balance between working fluid loss in the vent gas and energy recovery in the expander. As previously noted, working fluid loss in the vent gas is decreased by degassing the inlet hot brine or hot water feed, as at 12. Accordingly, operation of accumulator 40 is carried out at a pressure greater than the saturation pressure of the working fluid, which is fixed by the temperature set in the accumulator, and which is essentially fixed by the available cooling water temperature or ambient air temperature.

This procedure reduces the concentration of working fluid vapors in the uncondensible stream vented through line 70. The following relation holds approximately:

$$Y_{wf} = P^{\circ}_{wf}/P_t$$

Where, $Y_{wf}$ is the mole fraction of the working fluid in the vapor in the accumulator 40, $P^{\circ}_{wf}$ is the saturation pressure of the working fluid corresponding to the liquid working fluid temperature in the accumulator 40, and $P_t$ is the total pressure in the accumulator 40 set by the control system. The higher the setting of $P_t$, the lower the loss of working fluid in the vent gas, but also the lower the work removed from the system by expander 24 through shaft 26. There will be an economic balance point for the value of $P_t$. Accordingly, the pressure in the accumulator to meet the above criteria corresponds to the expander outlet pressure less the pressure drop through the cooler 34.

The condensed working fluid in accumulator 40 is removed through line 42 and through pump 44 to pressurize the working fluid approximately to the pressure in heat transfer column 46 and the pressurized fluid is then fed via valve 45 to the bottom portion 49 of the heat transfer column 46, to be reheated. Cooled brine or water at 51 in the bottom of the heat transfer column is fed via line 48 and valve 53 therein to a flash drum 50, which is at a lower pressure than that in the accumulator. The preferred flash drum pressure is in the range of about 15 psia to about 250 psia, and the preferred flash drum temperature is in the range of about 80° F. to about 200° F. Water from accumulator 40 is fed through line 68 to flash drum 50.

The working fluid flashed off in drum 50 from the cooled brine or water at 48 and the water from the accumulator, is fed through line 52 and via valve 54 to a compressor 56. The working fluid is compressed to a pressure corresponding to the above noted pressure at the work expander outlet, and preferably ranging from about 30 psia to about 250 psia. The compressed working fluid is then returned for cooling and recovery through line 30, for admixture with the working fluid expander discharge in line 28.

Uncondensible gases plus working fluid losses are vented from the system and the accumulator 40, through line 70. Make-up working fluid can be introduced into the accumulator at 72. Cooled brine or water is discharged at 57 from the flash drum 50 through pump 58 and line 60. Any scale formed in the heat exchanger column 46 can be separated at 71 in the bottom of the heat transfer column and discharged through line 62.

Use of the flash drum 50 which is held at a lower pressure than the accumulator 40, to separate flashed vapors of working fluid which are then compressed in compressor 56 so that working fluid can be recovered by cooling and condensation, is a feature of the invention process and system. Reduction of pressure in the flash drum below the saturation pressure of working fluid at the bottom of column 46 will cause entrained working fluid in line 48 to vaporize in the drum 50. Also, dissolved working fluid in both the cooled brine or water at 48 and in the water at 68 from the accumulator, will partially vaporize in the flash drum. The extent of dissolved working fluid vaporization is relatively high due to the nonideal nature of the solution.

Figures 1A, 3, 4:
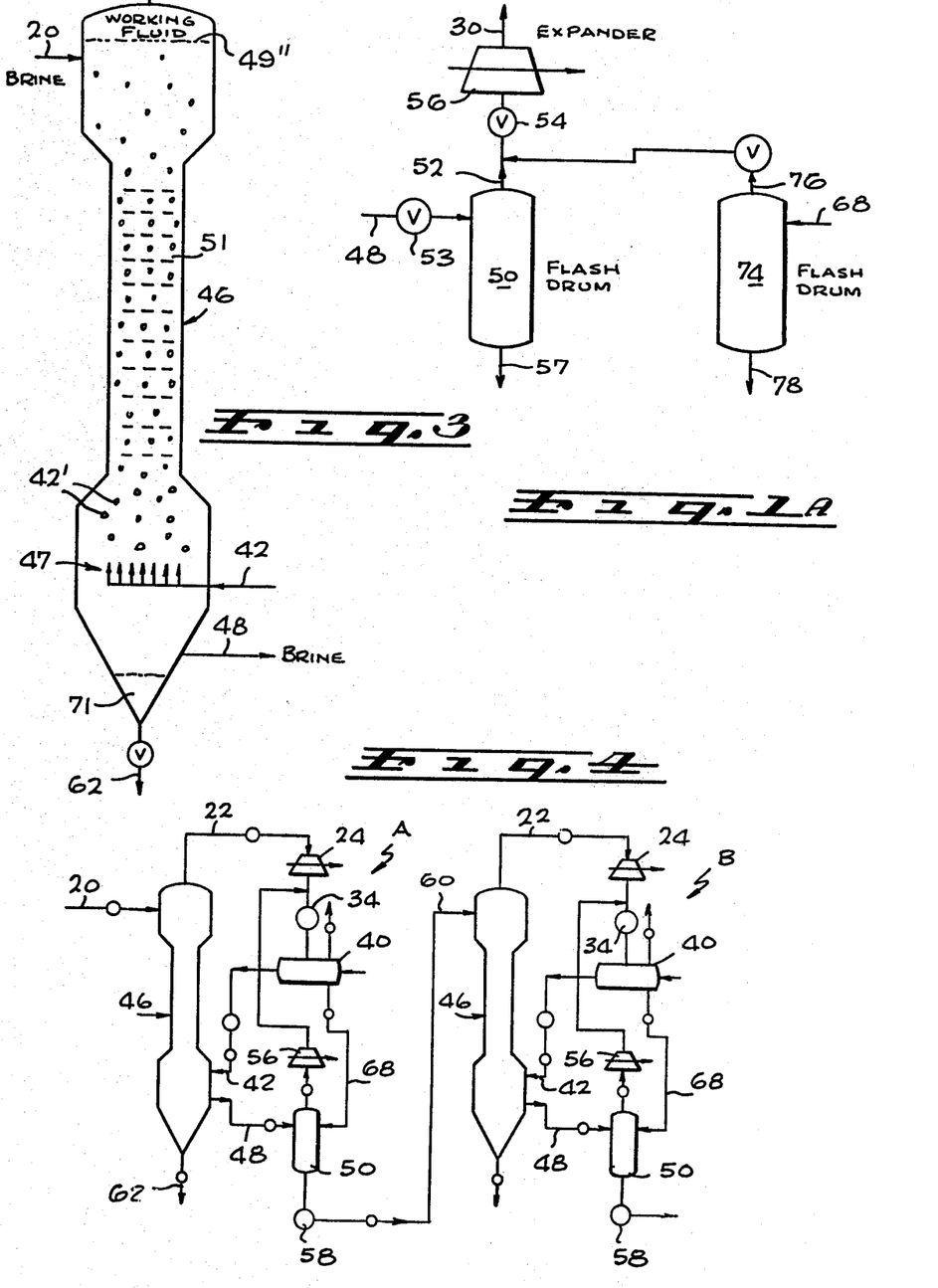
FIG. 1a is a modification of the process and system of FIG. 1, employing two flash drums.
FIG. 3 illustrates a modification of the process and system of FIG. 1, wherein the brine or water feed to the heat transfer column is the continuous phase.
FIG. 4 is a modification of the basic system illustrated in FIG. 1, employing a plurality of the basic units shown in FIG. 1.

If desired, referring to FIG. 1a, condensed water in line 68 withdrawn from the accumulator, alternatively can be introduced into a separate flash drum 74, similar to 50, with the flashed working fluid exiting therefrom at 76 being mixed with the flashed working fluid at 52 withdrawn from the flash drum 50, and the mixed working fluid passed to the intake of the compressor 56. This modification permits removal of water at 78 from the separator 74, of a purity sufficient for use as drinking water.

According to another modification, additional working fluid can be removed in the process and system illustrated in FIG. 1 if flash drum 50 is replaced by a stripping column. This modification is illustrated in FIG. 2 of the drawing, employing a stripping column 50' with a portion of uncondensible gas in line 70, which contains some working fluid, recycled via line 64 and valve 65 to the stripping column 50' for stripping working fluid from the cooled brine or water in line 48 and from the accumulator water at 68. The stripping gas in line 64 consists of carbon dioxide, hydrogen sulfide and ammonia, which enter with the brine or hot water feed at 10. Where, however, the column feed is hot water which has been solar heated, the stripping gas in line 64 can be a mixture of nitrogen and oxygen resulting from the solubility of the air in the water.

Since the flash drum 50 or the stripping column 50' operates at a pressure lower than that in the accumulator 40 at the outlet of the expander-cooler system, as previously noted, any entrained or dissolved working fluid in the brine or water entering the flash drum or stripping column through line 48 will substantially vaporize. When the liquid working fluid phase is thus removed from the brine or water entering at line 48, the equilibrium working fluid concentration in the brine or water becomes very small compared to what it is in the presence of the liquid working fluid phase. Therefore, losses of working fluid in the exit brine or water at 60 are very low.

However, as previously noted, losses of working fluid occur in the exit $CO_2$, $H_2S$ and $NH_3$ gas at 70 from the accumulator 40. At least part of this gas is stripped out of the brine by the working fluid in the heat transfer column 46. The stripped gas purged at 70 will carry working fluid away with it. The accumulator pressure can be raised relative to the accumulator temperature to decrease the concentration of working fluid in the accumulator gas at 70. However, this mode of operation decreases the amount of energy that can be extracted from the system. At practical energy recovery levels, the purged gas at 70 will still contain substantial quantities of working fluid, of the order of about 50 to about 80% by weight. Thus, removal of gases from the geothermal brine or hot water prior to feeding the brine to the heat transfer column, e.g. by steam stripping, simple flashing, or adsorption on a solid material, as at 12, is preferred, for reducing such working fluid losses.

In the process and system illustrated in FIG. 1, the working fluid is the continuous phase. However, in the embodiment illustrated in FIG. 3, the distributor 47 can be positioned in the bottom of the heat transfer column and the pressurized working fluid in line 42 passed into the distributor and sprayed upwardly in the column in countercurrent direct heat exchange relation with the brine or water entering at the top of the column. In this embodiment of the water containing or brine phase 51 is the continuous phase, the working fluid is the discontinuous phase, and the interface 49'' between the brine or water and the working fluid phase is at the top of the column.

In order to avoid temperature pinch in the column, that is a substantial reduction of the temperature differential between the hot brine or water and the working fluid along the length of the column, thereby substantially reducing heat transfer from the hot brine or water to the working fluid, the rate of circulation of the working fluid in the column must be decreased. However, as the flow rate of the working fluid is decreased this increases the temperature of the cooled brine or water in the bottom of the column, leaving substantial heat energy remaining in the cooled brine or water exiting the bottom of the column. Thus, where the hot brine or hot water feed is, for example, 322° F., the exiting cooled brine or water at 48 can be at a relatively high temperature of about 180° F.

In order to recover the remaining energy from the water or brine leaving the system at 48 and 60 in FIG. 1, and referring to FIG. 4, such exiting brine or water is fed into the heat transfer column 46 of a second unit B essentially identical to the energy recovery unit A illustrated in FIG. 1, and including elements 46, 24, 34, 40, 50, and 56, unit B being in series with Unit A, and the operating cycle described above is repeated in Unit B. In the Unit B, however, a different working fluid, preferably a mixture of hydrocarbons, e.g. a mixture of ethane and propane, is generally used to adjust the critical temperature conditions of such working fluid in relation to the temperature of the incoming brine or water feed at 60. The result is the recovery of additional energy in Unit B from each unit of weight of brine or water exiting Unit A.

The following is an example of practice of the invention process and system described above and illustrated in FIG. 1, it being understood that such example is merely illustrative and not limitative of the invention.

EXAMPLE 1

Hot water at 322° F. is pumped into the top of a heat transfer column operated at an internal pressure of 575 psia. In the heat transfer column the hot water is passed into direct contact heat exchange relation with isobutane. The working fluid circulation in the column is set low enough to be sure that there is no temperature pinch or substantially reduced Δt driving force between the temperature of the hot water and the isobutane working fluid throughout the length of the column.

The isobutane working fluid thus heated by the hot water feed in the heat transfer column is converted to a dense phase fluid at a pressure of 565 psia and temperature of 300° F., and is expanded through an expander to produce work. The expanded working fluid discharged from the expander is at a temperature of 178° F. and a pressure of 142 psia.

The isobutane working fluid is cooled and condensed in a cooler to an outlet temperature of 100° F. and a pressure of 132 psia. The isobutane working fluid condensate thus formed is introduced into an accumulator and is separated therein from uncondensible gases and condensed water. The condensed isobutane from the accumulator is then pumped at about 575 psia back into the bottom of the heat transfer column to be reheated by the hot water feed.

Cooled water from the bottom of the heat transfer column at a temperature of about 182° F. and water separated in the accumulator are fed to a flash drum operated at a pressure of 15 psia. The isobutane working fluid flashed off from the top of the flash drum is compressed to a pressure of about 142 psia and is mixed with isobutane working fluid discharged from the expander, and the resulting mixture is returned to the cooler for condensation and recovery of working fluid in the accumulator.

Water at about 182° F. is removed from the flash drum and pumped to a solar heater where it is heated to 322° F. and recycled as feed to the heat transfer column.

The uncondensible gases including nitrogen and oxygen, are vented from the system at the accumulator, carrying away some of the isobutane working fluid.

Make-up isobutane working fluid is introduced at a pressure of 132 psia into the accumulator to compensate for lost working fluid from the accumulator.

Calculated on a basis of the use of 0.65 lb. isobutane working fluid to 1 lb. of hot feed water, 8.8 Btu of net work is obtained from the system, considering all equipment including the expander and the pumps operating at 80% efficiency.

Removal of dissolved nitrogen and oxygen from the hot water feed prior to feeding the hot water to the heat transfer column decreases the amount of working fluid make-up and allows the expander outlet pressure to be reduced, thus allowing an increase in net work out of the system.

In the embodiment described above and illustrated particularly in FIG. 1, the pressure in the accumulator 40 is controlled to provide an economic balance between the energy obtained from the expander 24 and the loss of working fluid in the vent gas from the accumulator, at 70. A preferred mode of procedure embodying a number of additional features of the invention is illustrated in FIG. 5 of the drawing.

Figure 5:
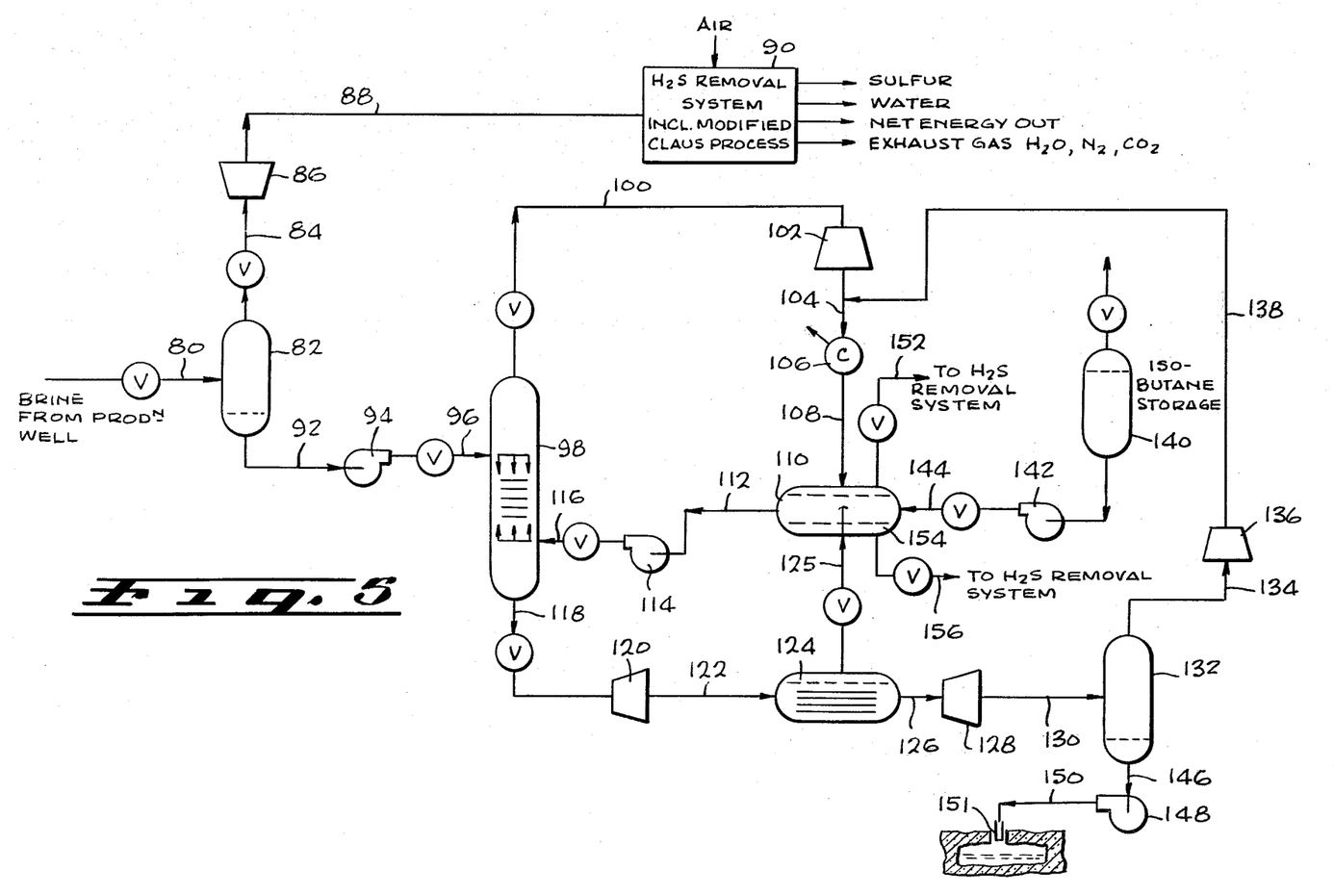
FIG. 5 is a flow chart illustrating a preferred mode of practice of the invention.

Referring to FIG. 5, hot water-containing fluid or brine, indicated at 80, from a geothermal production well, is introduced under pressure into an initial brine flash drum 82, flashing off steam and uncondensible gas including H$_2$S, such steam and uncondensible gas at 84 being fed to an expander 86 for recovery of energy, the expanded mixture of steam and H$_2$S at 88 being introduced into an H$_2$S removal system indicated at 90, and described in greater detail hereinafter.

The degassed hot brine at 92 discharged from the brine flash drum 82 is pressurized at pump 94 and the pressurized brine at 96 is introduced into the upper portion of a heat transfer column 98 which is similar in construction to the heat transfer column 46 of FIG. 1. As described above, the heat transfer column 98 is operated at or above the critical pressure of the working fluid, with the hot brine feed at or above the critical temperature of the working fluid, and converting the working fluid to a dense phase fluid.

The heated dense phase working fluid in the top of the column is passed through conduit 100 and fed to the work expander 102 wherein the fluid expands to produce work, the expander discharge working fluid being passed via line 104 to the cooler 106, and the condensed working fluid being then fed through conduit 108 to an accumulator 110, similar to the system described in FIG. 1 above.

Condensed working fluid in accumulator 110 is removed through line 112 and is pressurized by pump 114 and recycled at 116 to the heat transfer column 98, similar to the system described in FIG. 1. Cooled brine at 118 discharged from the bottom of the heat transfer column 98, according to the present preferred embodiment, is work expanded at 120 and the expanded brine discharge is introduced at 122 into a parallel plate oil or working fluid-water separator 124 which functions to reduce entrainment and loss of working fluid. Working fluid separated in separator 124 is passed via line 125 back to the accumulator 110 for recycling to the heat transfer column 98.

The brine discharge from the oil-water separator 124 is introduced at 126 into another work expander 128, and the resulting discharged brine at 130 is introduced into the brine flash drum 132 for recovery of working fluid. If desired, only a single work expander 120 can be used, and the second work expander 128 can be omitted.

The use of one or more parallel plate oil-water separator units 124 is preferred for more effective recovery of working fluid, but such oil-water separator units can be omitted.

The working fluid flashed off in drum 132 from the brine therein is fed through line 134 to a compressor 136 to compress the working fluid to a pressure corresponding to the pressure at the work expander outlet, and is then returned via conduit 138, for admixture with the working fluid expander discharge in line 104. Make-up working fluid in storage at 140 is pressurized at 142 and is fed as required via line 144 to the accumulator 110.

Cooled brine discharged at 146 from the brine flash drum 132 is pressurized at pump 148 and injected via line 150 into a brine injection well indicated at 151.

In a preferred mode of operation of the system of FIG. 5, the working fluid recovery flash drum 132 is operated at a higher pressure than the flash drum 50 in FIG. 1 and which is sufficiently high so that the recycle of uncondensible gases via line 138 to the accumulator 110 is low enough so that the accumulator can be operated with little or no vent gas at 152. For this purpose, the pressure in flash drum 132 is in the range of about 15 psia to about 250 psia, the corresponding flash drum temperature being in the range of about 80° F. to about 200° F.

In conjunction with such increased pressure in the flash drum 132, the accumulator 110 is operated at a lower pressure than accumulator 40 in FIG. 1, the accumulator 110 being operated essentially at the saturation pressure of the working fluid corresponding to the working fluid temperature in the accumulator, and which is a function of the available cooling water temperature. The pressure in the accumulator, for this purpose, can range from about 1 psia to about 600 psia, and the temperature from about 80° F. to about 150° F. Although the result of this procedure is to increase the loss of working fluid in the brine discharged from the flash drum 132 and which is injected into the brine injection well, the loss of working fluid in any vent gas from the accumulator at 152 is substantially eliminated. The result is that the overall or total loss of working fluid in the spent brine at 150 and in any vent gas at 152 will be less than in the procedure described above and employed in the operation of the process illustrated in FIG. 1. At the same time, the operation of the accumulator 110 at a relatively low pressure maximizes the amount of energy which can be extracted from the expander 102.

In the mode of procedure described above and illustrated in FIG. 5, uncondensible gas containing $H_2S$ as well as other uncondensibles such as $CO_2$ and $NH_3$, is dissolved in the spent brine at 150, injected into the brine injection well, and in the condensate water at 154 in the accumulator 110. The process and system described above in relation to FIG. 5 is particularly effective when the concentration of uncondensible gas in the brine feed at 96 is relatively low, whereas the procedure described above and illustrated in FIG. 1, employing lower flash drum pressures and higher accumulator pressures, is effective at relatively high concentrations of uncondensible gas in the brine feed to the heat transfer column.

Figure 6:
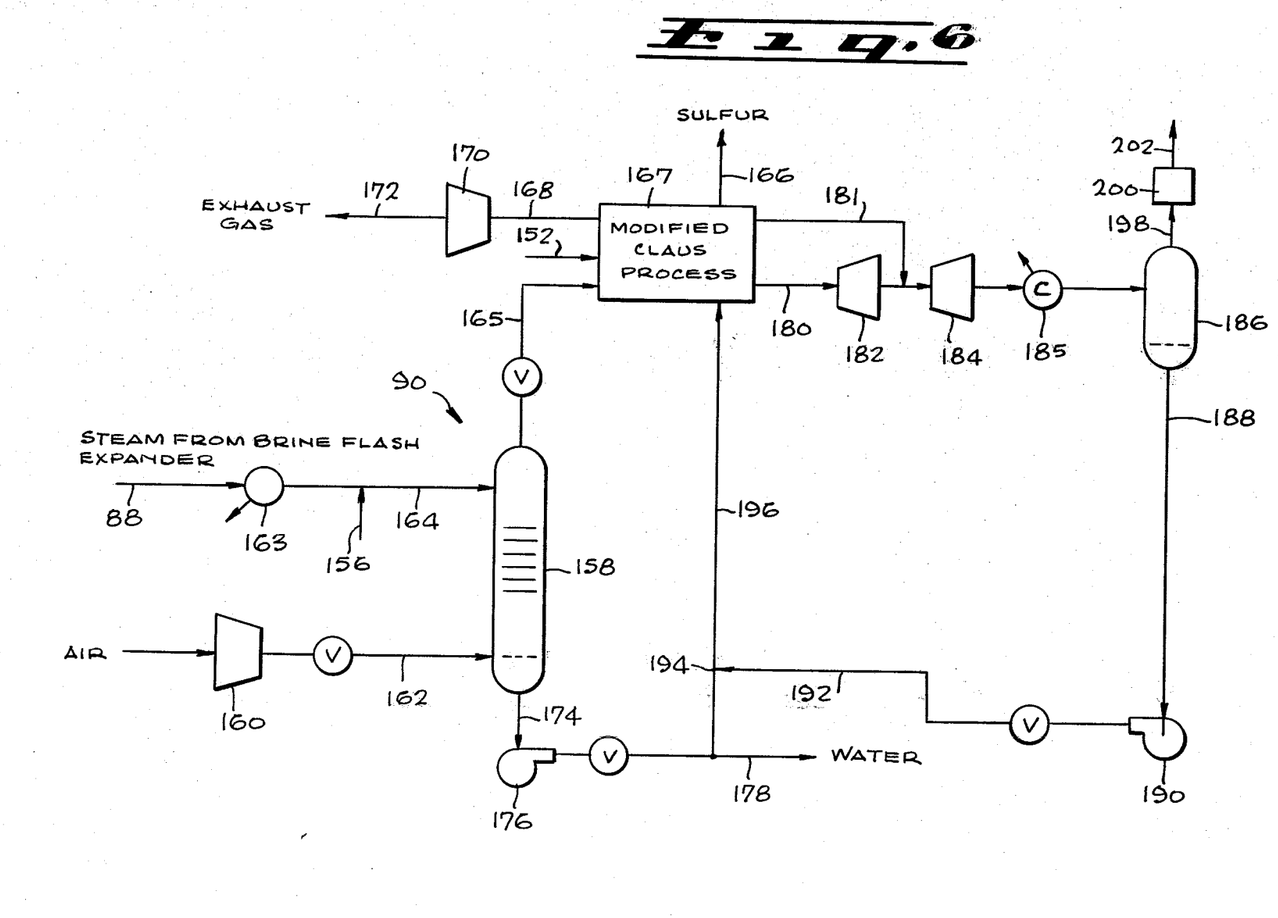
FIG. 6 illustrates a preferred $H_2S$ removal process and system employed particularly in conjunction with the preferred practice of the invention, as illustrated in FIG. 5.

Referring now to FIG. 6 showing a preferred $H_2S$ removal system 90 employed in conjunction with the geothermal energy conversion process and system of FIG. 5, $H_2S$-containing water condensate from the accumulator 110 is introduced via conduit 156 to a stripping column 158. Overhead steam at 88 discharged from the brine flash expander 86 in FIG. 5 and containing uncondensible gas including $H_2S$, is first cooled at 163 and the water therein is partially condensed. Water condensate withdrawn at 156 from the accumulator 110 is mixed with the cooled partially condensed mixture from the brine flash expander, and the resulting mixture is introduced at 164 into the upper portion of the stripping column 158. Air, compressed at 160, is introduced at 162 into the lower portion of the stripping column 158. The stripping column 158 can be operated at pressures ranging from about 15 psia to about 100 psia and temperatures of about 100° F. to 200° F. The mixture of overhead gases 165 from the stripping column 158, including air, steam and $H_2S$ gas, is introduced into a system for carrying out a modified Claus process at 167. The conventional Claus process is well known, e.g. as described in *Chemical Process Industries,* Third edition, R. N. Shreve, McGraw Hill Book Co., 1967, page 324. In this process, $H_2S$ is oxidized or burned first to form $SO_2$, additional $H_2S$ then reacting with the $SO_2$ to produce sulfur. Accordingly, sufficient air is introduced at 162 into the stripping column 158 for proper reaction with the $H_2S$ in the Claus process to produce sulfur. However, the Claus process carried out at 167 according to the present invention is a modified Claus process since steam is also present with the mixture of air and $H_2S$ introduced into the Claus process, the steam functioning to modify such process by adding an additional volume of diluting gas to the feed stream, and thus affecting the size and rating of equipment. Any gas containing $H_2S$ vented from the accumulator 110 at 152 in FIG. 5, also can be introduced to the modified Claus process at 167.

Sulfur is recovered at 166 from the modified Claus process 167, and exhaust gas at 168 from such process can be work expanded at 170 and discharged at 172.

Good quality water is discharged at 174 from the bottom of the stripping column 158, and is passed through pump 176 and recovered at 178. Steam discharged at different pressures at 180 and 181 from the modified Claus process can be work expanded in successive expanders 182 and 184, and the expanded discharge cooled at 185 and introduced into a separator 186, the resulting condensate discharged at 188 being fed to a pump 190 and the pump discharge at 192 being mixed at 194 with a portion of the water discharged from the stripping column 158, and the resulting water mixture fed by conduit 196 to the modified Claus process 167. Overhead steam at 198 from the separator 186 is passed through vacuum producing means indicated at 200, and the resulting low pressure steam at 202 is vented.

In the processes illustrated in FIG. 1 and also in FIGS. 5 and 6, the various conditions and stages of such processes can be controlled using the techniques of flow control, level control, pressure control and temperature control. For example, in the process illustrated in FIG. 5, the brine flow into the heat transfer column 98 can be controlled by flow control at the inlet valve in line 96, the working fluid flow into the heat transfer column 98 can be controlled by flow control at the inlet valve in line 116, which flow control can be reset by temperature control based on a temperature sensed at the top of heat transfer column 98, the dense phase fluid discharged through line 100 can be controlled by pressure control at the outlet valve in this line, from the heat transfer column, and the level of the interface between the working fluid and the brine in the heat transfer column 98 can be controlled by level control technique in conjunction with the valve in the outlet line 118 from the heat transfer column.

The following is an example of practice of the invention process and system described above and illustrated in FIGS. 5 and 6.

EXAMPLE 2

A hot brine from a geothermal well at a temperature of 330° F. is flashed to remove uncondensible gas and is pumped into the top of a heat transfer column operated at an internal pressure of about 560 psia. In the heat transfer column the brine is passed into direct contact heat exchange relation with isobutane introduced into the lower portion of the column.

The isobutane working fluid heated by the hot brine feed in the heat transfer column, is converted to a dense phase fluid and exits the heat transfer column at a temperature of 300° F. and is expanded through an expander to produce work. The expanded working fluid discharged from the expander is at a temperature of 159° F. and a pressure of 75 psia.

The isobutane working fluid is cooled and condensed in a cooler to an outlet temperature of about 100° F. and a pressure of 73.5 psia. The isobutane working fluid-water condensate thus formed is introduced into an accumulator and is separated therein from uncondensible gases and condensed water. The condensed isobutane from the accumulator is then pumped at about 560 psia back into the bottom of the heat transfer column to be reheated by the hot brine feed.

Cooled brine from the bottom of the heat transfer column at a temperature of about 157° F. is introduced into a work expander and the expanded discharged brine is fed to a flash drum operated at a pressure of 33 psia. The isobutane working fluid flashed off from the top of the flash drum and at a temperature of about 157° F. is compressed to a pressure of about 75 psia and is mixed with isobutane working fluid discharged from the first mentioned expander, and the resulting mixture is returned to the cooler for condensation and recovery of working fluid in the accumulator.

Brine at about 157° F. and containing a small amount of isobutane and dissolved uncondensible gas, is removed from the flash drum and pumped at about 1500 psig to a brine injection well.

Under the relatively high pressure of 33 psia in the brine flash drum and the relatively low pressure of 73.5 psia in the accumulator, which is approximately at the saturation pressure corresponding to the approximately 100° F. temperature of the isobutane in the accumulator, there is little or no vent gas from the accumulator. Any small amount of uncondensible gas entering the system leaves the system dissolved in the brine sent to the injection well and in the water condensate from the accumulator.

Make-up isobutane working fluid is introduced at a pressure of 73.5 psia into the accumulator to compensate for lost working fluid.

Calculated on a basis of the use of 0.83 lb. isobutane working fluid to 1 lb. of hot brine feed, 17.7 Btu of net work is obtained from the system, considering all equipment including expanders and the pumps operating at 80% efficiency. The rate of loss of isobutane from the system is about 0.006% of the total isobutane working fluid circulation rate through the system.

In the $H_2S$ removal system, steam and uncondensible gas from the initial flashing of the brine feed prior to introduction thereof into the heat exchange column, and at a temperature of 330° F. and a pressure of about 104 psia, and containing $CO_2$ and $H_2S$, is work expanded, the discharged steam containing the uncondensible gases being at a pressure of 26.5 psia and a temperature of 243° F. Such steam is cooled and mixed with the water condensate from the accumulator at 100° F. and containing a small amount of isobutane and a trace of $H_2S$ and $CO_2$. The resulting mixture at about 160° F. is introduced into a stripping column, into which is also fed compressed air at a temperature of 257° F.

Good quality water at about 158° F. is removed from the bottom of the stripping column. The overhead from the stripping column and consisting of a mixture of steam, air, a small amount of isobutane, $CO_2$ and $H_2S$ is fed to a modified Claus process producing sulfur as product. The exhaust gas from the modified Claus process at 61 psia and 250° F. is work expanded and removed at a temperature of 174° F. Steam discharged from the modified Claus process at 50 psia and 165 psia is work expanded in separate expanders and condensed, and the condensate, at about 100° F. is mixed with a portion of the water from the bottom of the stripping column and is recycled to the modified Claus process. There is a net production of good quality water from the bottom of the stripping column of about 0.06 lb. per lb. of brine feed.

In the $H_2S$ removal system a net gain of 0.18 Btu of energy per lb. of brine feed is recovered, with all mechanical equipment considered as operating at 80% efficiency.

Energy can also be recovered according to the invention from water sources at lower temperatures than geothermal brines. Thus, for example, ocean brines, which are solar heated, and often at temperatures substantially lower than 100° F., e.g. down to about 60° F., can be used as feed in the invention process and system. Such brines are also understood to be encompassed within the term "hot water sources" employed herein, as contrasted to sea water brines of substantially lower temperature, for example deep sea water at about 35° F. Where ocean brine at a temperature of about 60° F. is employed as feed to the invention process and system, the working fluid is preferably in the form of a mixture of ethane and a small amount of methane, in order to provide a working fluid having a critical temperature such that the brine feed temperature is above the critical temperature of such working fluid.

From the foregoing, it is seen that the invention affords a novel and efficient process and system for recovery of energy from geothermal brines and other hot water sources, employing direct contact heat exchange between the hot geothermal brine or hot water and a working fluid, preferably a hydrocarbon such as propane, n-butane or isobutane, for extraction of energy from the heated working fluid in an expander, and incorporating procedure and means for efficient recovery of working fluid and recycling thereof for heat transfer with the geothermal brine or other hot water feed, particularly under conditions maximizing energy recovery from the system. The invention also includes as an additional feature the efficient removal of uncondensible gases, particularly $H_2S$, in conjunction with a procedure and system for converting such $H_2S$ to sulfur.

In view of the foregoing, it will be apparent also that the process and system of my above copending application Ser. No. 611,310 can be improved similarly by incoporating the features of the present application, into such process and system of my above Ser. No. 611,310 application. Thus, for example, according to the process of said last mentioned application, the working fluid can be heated to produce boiling thereof in the upper portion of the heat transfer zone, such heat transfer zone being maintained at a pressure below the critical pressure of the working fluid, and the boiling vapors of the working fluid expanded in an expander to produce work. The features of the present application, including, for example, operation of the working fluid recovery flash system at a sufficiently high pressure in relation to the pressure in the accumulator so that the recycle of uncondensible gases to the accumulator is substantially reduced, simple flashing of the feed brine and recovery of the energy of the resulting steam in an expander, thereby also decreasing the amount of uncondensible vent gas from the accumulator, the $H_2S$ removal system, the use of one or more liquid expanders in the exit brine line from the heat transfer column, and the use of one or more working fluid separators in the brine exit system, can be incorporated into the above process of the Ser. No. 611,310 application.

While I have described particular embodiments of my invention for purposes of illustration, it will be understood that various changes and modifications within the spirit of the invention can be made, and the invention is not taken as limited except by the scope of the appended claims.

What is claimed is:

1. Process for recovery of energy from hot water-containing fluids including geothermal brines and other hot water sources, said hot water-containing fluids including uncondensible gases, which comprises
   (a) introducing said hot water-containing fluid into a heat transfer zone and directly contacting said hot water-containing fluid therein with a working fluid in liquid form, said heat transfer zone being maintained at or above the critical pressure of said working fluid and said hot water-containing fluid being at a temperature at or above the critical temperature of said working fluid, to provide
       (i) a dense phase working fluid and
       (ii) a cooled water containing fluid including a portion of said working fluid, and uncondensible gas,
   (b) expanding said dense phase working fluid in an expander to produce work,
   (c) discharging said expanded working fluid,
   (d) cooling said discharged working fluid to provide a condensed working fluid comprising condensed water vapor and uncondensible gas,
   (e) separating, in an accumulator zone, said condensed working fluid from said condensed water and uncondensible gas,
   (f) venting said uncondensible gas from said accumulator zone,
   (g) returning said separated working fluid under pressure to said heat transfer zone,
   (h) withdrawing said cooled water-containing fluid from said heat transfer zone,
   (i) flashing said withdrawn water-containing fluid to flash off said portion of said working fluid and provide a further cooled water-containing fluid, said flashing being carried out at a pressure sufficiently high to minimize the amount of uncondensible gas flashed off with said working fluid,
   (j) compressing said flashed working fluid,
   (k) mixing said compressed working fluid with said discharged working fluid, and
   (l) discharging said further cooled water-containing fluid whereby the level of uncondensible gases recycled to said accumulator zone is reduced to a level that little or no uncondensible gas is vented from said accumulator zone.

2. The process as defined in claim 1, said accumulator zone being operated substantially at the working fluid saturation pressure corresponding to the working fluid temperature in said accumulator zone.

3. The process as defined in claim 1, comprising dissolving the uncondensible gases in said condensed water in said accumulator and in said discharged further cooled water-containing fluid.

4. The process as defined in claim 1, wherein said working fluid is a hydrocarbon selected from the group consisting of aromatics, paraffins, naphthenes and olefins, and mixtures thereof.

5. The process as defined in claim 1, wherein said working fluid is a paraffinic or olefinic hydrocarbon containing from about 1 to about 8 carbon atoms, or mixtures thereof.

6. The process as defined in claim 5, said hydrocarbon containing 2 to 5 carbon atoms, selected from the group consisting of methane, ethane, propane, n-butane, isobutane, n-pentane, isopentane and neopentane, and the analogous olefins, and mixtures thereof.

7. The process as defined in claim 1, including the step of removing the major portion of uncondensible gases in said hot water containing fluid prior to introduction thereof into said heat transfer zone.

8. The process as defined in claim 7, comprising flashing said hot water-containing fluid prior to introduction thereof into said heat transfer column to flash off a mixture of steam and uncondensible gases, and work expanding said mixture to recover energy.

9. The process of claim 8, wherein said uncondensible gas includes $H_2S$, and further including the steps of cooling said work expanded mixture of steam and uncondensible gas to partially condense water from said mixture,
   mixing said partially condensed water with condensed water from the accumulator zone to form a $H_2S$ containing solution
   stripping said $H_2S$ containing solution with air in a stripping zone to remove an overhead mixture comprising $H_2S$, steam and air,
   converting the $H_2S$ in said overhead mixture to sulfur in a modified Claus process, and
   recovering said sulfur.

10. The process as defined in claim 9, including work expanding steam and exhaust gases from said modified Claus process and withdrawing good quality water from the bottom of said stripping zone.

11. The process as defined in claim 9, including passing said vented gas containing $H_2S$ into said modified Claus process.

12. The process as defined in claim 1, including work expanding said cooled water-containing fluid withdrawn from said heat transfer zone prior to flashing said withdrawn water-containing fluid.

13. The process as defined in claim 1, including passing said cooled water-containing fluid into a separator zone to separate working fluid, and returning said separated working fluid to said accumulator zone.

14. The process as defined in claim 1, and hot water-containing fluid being brine, and including injecting the discharged further cooled water-containing fluid, into a brine injection well.

15. The process as defined in claim 1, said flash zone being maintained at a pressure ranging from about 15 to about 250 psia and at a temperature ranging from about 80° F. to about 200° F.

16. The process as defined in claim 1, the pressure in said accumulator zone being in the range of about 1 to about 600 psia, and the temperature in the range of about 80° F. to about 150° F., and said flash zone being maintained at a pressure ranging from about 15 to about 250 psia and at a temperature ranging from about 80° F. to about 200° F.

17. The process as defined in claim 1, wherein said hot water-containing fluid comprises brine.

18. System for recovering energy from hot water-containing fluids, including geothermal brines and other hot water sources, wherein said hot water-containing fluids include uncondensible gas which comprises in combination
(a) a heat transfer column,
(b) pump means for pressurizing and introducing said hot water-containing fluid into said column,
(c) means for introducing a working fluid into said column,
(d) means for maintaining said heat transfer column at or above the critical pressure of said working fluid and for maintaining the temperature at the top of the column at or above the critical temperature of said working fluid,
(e) an expander,
(f) means for withdrawing hot working fluid from said column and introducing said fluid as feed to said expander,
(g) cooling means for cooling and condensing said expanded working fluid,
(h) accumulator means for separating and condensing working fluid from condensed water and uncondensible gas,
(i) conduit means interconnecting said expander, said cooling means and said accumulator means,
(j) means for returning said condensed working fluid to said heat transfer column, and including means for removing at least a portion of uncondensible gas in said hot water-containing fluid prior to introduction thereof into said heat transfer column, said means (j) including flash means to flash off steam and uncondensible gas,
(k) steam expander means interconnected with said flash means for recovering the energy from said steam,
(l) a stripping column,
(m) conduit means for interconnecting said steam expander means and said stripping column, (q) cooling means in said conduit means (m) for cooling expanded steam containing uncondensibles including H$_2$S, prior to introduction into said stripping column,
(n) conduit means for introducing water condensates from said accumulator means into said conduit means interconnecting said steam expander and said stripping column, downstream from said cooling means,
(o) means for introducing air into said stripping column,
(p) conduit means for withdrawing water from the bottom of said stripping column,
(q) means for converting H$_2$S in the overhead from said stripping column, into sulfur,
(r) conduit means interconnecting said stripping column and said means (q) for introducing a mixture of steam, air and uncondensible gas including H$_2$S into said H$_2$S converting means, and
(s) means for withdrawing sulfur from said means (g).

19. The system as defined in claim 18, including
(t) conduit means for withdrawing exhaust gas and steam from said means (q), and
(u) means for work expanding said exhaust gas and said last mentioned steam for recovery of energy.

20. The system as defined in claim 18, the H$_2$S converting means being a modified Claus system.

21. System for recovering energy from hot water containing fluids including geothermal brines and other hot water sources, which comprises in combination a heat transfer column, pump means for pressurizing and introducing said hot water containing fluid into said column, means for introducing a working fluid into said column, means for maintaining said heat transfer column at or above the critical pressure of said working fluid and for maintaining the temperature at the top of the column at or above the critical temperature of said working fluid, an expander, means for withdrawing hot working fluid from said column and introducing said fluid as feed to said expander, cooling means for cooling and condensing said expanded working fluid, accumulator means for separating and condensing working fluid from condensed water and uncondensible gas, conduit means interconnecting said expander, said cooling means and said accumulator means, means for returning said condensed working fluid to said heat transfer column, conduit means for withdrawing cooled water containing fluid from the bottom portion of said heat transfer column, flash means, said last mentioned conduit means communicating with said flash means for introducing said cooled water containing fluid therein, means for compressing the resulting vaporized working fluid withdrawn from said flash means, conduit means interconnecting said flash means and said compressing means, and conduit means from the discharge of said compressing means for mixing the compressed working fluid with the working fluid discharged from said expander and prior to introduction thereof into said cooling means, and including work expander means in said conduit means for withdrawing cooled water containing fluid from the bottom portion of said heat transfer column and communicating with said flash means, for work expanding and recovering energy from said water containing fluid prior to introduction thereof into said flash means.

22. The system as defined in claim 21, including working fluid-water containing fluid separating means in said conduit means for withdrawing cooled water containing fluid from the bottom portion of said heat transfer column, prior to said flash means, and conduit means interconnecting said last mentioned separating means and said accumulator means, for returning separated working fluid to said accumulator means.

23. System for recovering energy from hot water containing fluids including geothermal brines and other hot water sources, which comprises in combination a heat transfer column, pump means for pressurizing and introducing said hot water containing fluid into said column, means for introducing a working fluid into said column, means for maintaining said heat transfer column at or above the critical pressure of said working fluid and for maintaining the temperature at the top of the column at or above the critical temperature of said working fluid, an expander, means for withdrawing hot working fluid from said column and introducing said fluid as feed to said expander, cooling means for cooling and condensing said expanded working fluid, accumulator means for separating and condensing working fluid from condensed water and uncondensible gas, conduit means interconnecting said expander, said cooling means and said accumulator means, means for returning said condensed working fluid to said heat transfer column, conduit means for withdrawing cooled water containing fluid from the bottom portion of said heat transfer column, flash means, said last mentioned conduit means communicating with said flash means for introducing said cooled water containing fluid therein, means for compressing the resulting vaporized working fluid withdrawn from said flash means, conduit means interconnecting said flash means and said compressing means, and conduit means from the discharge of said compressing means for mixing the compressed working fluid with the working fluid discharged from said expander and prior to introduction thereof into said cooling means, and including working fluid-water containing fluid separating means in said conduit means for withdrawing cooled water containing fluid from the bottom portion of said heat transfer column, prior to said flash means, and conduit means interconnecting said last mentioned separating means and said accumulator means, for returning separated working fluid to said accumulator means.

24. Process for recovery of energy from hot water containing fluids including geothermal brines and other hot water sources, which comprises introducing said hot water containing fluid in a heat transfer zone in heat exchange relation therein with a working fluid in liquid form, and heating and converting said working fluid to a dense phase fluid, said heat transfer zone being maintained at or above the critical pressure of said working fluid, and said hot water containing fluid being at a temperature at or above the critical temperature of said working fluid, expanding said heated dense phase working fluid in an expander to produce work, cooling and condensing said expanded working fluid, separating said condensed working fluid from condensed water and uncondensible gas, returning said condensed working fluid under pressure to said heat transfer zone for reheating therein, withdrawing cooled water containing fluid from said heat transfer zone, flashing said last mentioned fluid to flash off working fluid contained in said cooled water containing fluid, compressing the resulting vaporized working fluid, and mixing said compressed working fluid with the working fluid discharged from said expander and prior to cooling and condensation thereof, including work expanding said cooled water containing fluid withdrawn from said heat transfer zone prior to flashing said fluid in said flash zone.

25. Process for recovery of energy from hot water containing fluids including geothermal brines and other hot water sources, which comprises introducing said hot water containing fluid in a heat transfer zone in heat exchange relation therein with a working fluid in liquid form, and heating and converting said working fluid to a dense phase fluid, said heat transfer zone being maintained at or above the critical pressure of said working fluid, and said hot water containing fluid being at a temperature at or above the critical temperature of said working fluid, expanding said heated dense phase working fluid in an expander to produce work, cooling and condensing said expanded working fluid, separating said condensed working fluid from condensed water and uncondensible gas in an accumulator zone, returning said condensed working fluid under pressure to said heat transfer zone for reheating therein, withdrawing cooled water containing fluid from said heat transfer zone, flashing said last mentioned fluid to flash off working fluid contained in said cooled water containing fluid, compressing the resulting vaporized working fluid, and mixing said compressed working fluid with the working fluid discharged from said expander and prior to cooling and condensation thereof, including passing said cooled water containing fluid withdrawn from said heat transfer zone prior to flashing said fluid in said flash zone, into a separator zone to separate working fluid in said cooled water containing fluid, and returning said separated working fluid to said accumulator zone.

* * * * *